March 10, 1964  L. C. BURNS ETAL  3,124,364
PISTON RING ASSEMBLY
Filed March 15, 1961  2 Sheets-Sheet 1

INVENTORS
LEO. C. BURNS, LEWIS M. DAVIS
CALVIN N. DeBRUIN & LEE H. SAYLOR
BY
Barnes, Kisselle, Raisch & Choate
ATTORNEYS March 10, 1964

L. C. BURNS ETAL 3,124,364

PISTON RING ASSEMBLY

Filed March 15, 1961

INVENTORS
LEO C. BURNS, LEWIS M. DAVIS,
CALVIN N. DE BRUIN & LEE H. SAYLOR
BY
Barnes, Kisselle, Raisch & Choate
ATTORNEYS

United States Patent Office 3,124,364
Patented Mar. 10, 1964

3,124,364
PISTON RING ASSEMBLY
Leo C. Burns, Lewis M. Davis, Calvin N. De Bruin, and Lee H. Saylor, all of Muskegon, Mich., assignors to Sealed Power Corporation, Muskegon, Mich., a corporation of Michigan
Filed Mar. 15, 1961, Ser. No. 95,945
8 Claims. (Cl. 277—76)

This invention relates to piston rings and more particularly to improved oil ring assemblies and expander-spacers for use therein.

It is established practice in the piston ring art to construct oil rings in the form of an assembly of a pair of circular, parted, flat thin rings termed "rails" which are spaced axially apart by an intermediate abutting structure adapted to also exert circumferential expansion loads on the rails. The intermediate structure of such an oil control ring assembly is preferably a one-piece combination type expander-spacer such as that disclosed in U.S. Patent No. 2,789,872 granted April 23, 1957 to H. M. Olson. This expander-spacer as well as others of open construction permit oil which is wiped from the cylinder wall and collected between the upper and lower rails to drain inwardly through the expander-spacer to oil drainage holes which return the oil through the skirt of the piston to the crankcase.

It has been found that when oil control ring assemblies of the above multi-piece abutment type are subjected to operating conditions in which high oil temperatures are encountered, such as in heavy duty, constant high speed truck operation, there is a serious problem of oil ring clogging and lock-up due to carbon formation. The locking-up process occurs as a result of decomposition of the oil under high temperature, causing a hard deposit to form on the side of the rail adjacent to the expander-spacer. Carbon deposits may also adhere to the expander-spacer itself, but they principally build up on the rails, following the contour of expander-spacer. As such deposits build up, they increasingly restrict the spring action of the expander-spacer until finally it is completely prevented from exerting radial force against the rails. When the oil control ring assembly is thus strangled, oil control between the crankcase and combustion chamber drops off to such an extent that the oil ring is rendered practically useless long before it is actually worn out.

It is therefore an object of the present invention to provide an improved piston oil ring assembly of economical construction which is capable of maintaining effective oil control under heavy duty operation during the life of the assembly.

Another object is to provide an improved piston ring assembly for use in the oil groove of a piston which reduces the number of oil sealing rails required for effective operation while preventing clogging and lockup which would otherwise result from deposits being formed in critical areas of the assembly.

A further object of this invention is to provide an improved expander-spacer which is readily formed as a one-piece member for supporting an oil control rail disposed between the upper side of the oil groove and the expander-spacer.

Figure 1:
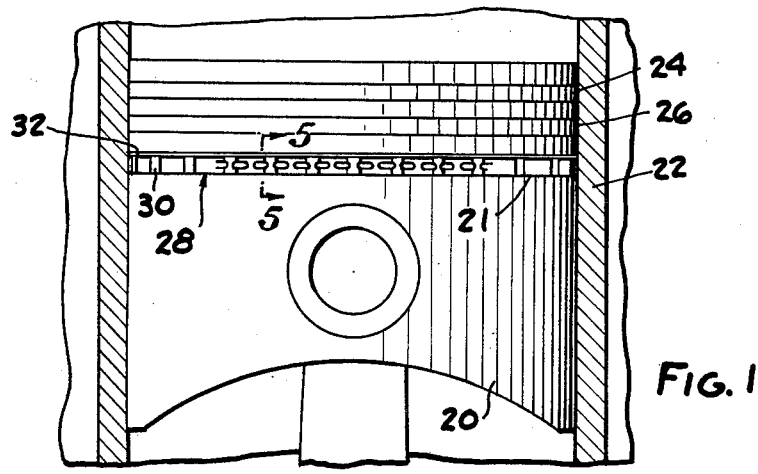
FIG. 1 is a fragmentary elevational view of a piston equipped with an oil ring assembly in accordance with the invention.

Referring in detail to the accompanying drawings, FIG. 1 shows a piston 20 installed in a cylinder 22 and having a pair of conventional split, solid compression rings 24 and 26 mounted in upper and middle piston ring grooves respectively. An oil control ring assembly 28 constructed in accordance with the present invention is mounted in the lowermost oil groove 21 of piston 20. Oil ring assembly 28 is a multi-piece non-bottoming self-expansion type oil ring comprising a combination expander-spacer 30 associated with one or more cylinder wall engaging rails 32 disposed intermediate the upper side of oil groove 21 and expander-spacer 30. It is to be noted that, unlike the aforesaid oil rings of the prior art having cylinder-wall-engaging rails both above and below the intermediate expander-spacer structure, the oil ring assembly 28 of the present invention is generally characterized by the absence of such rails between the expander-spacer and the lower side of the oil groove.

Figure 2:
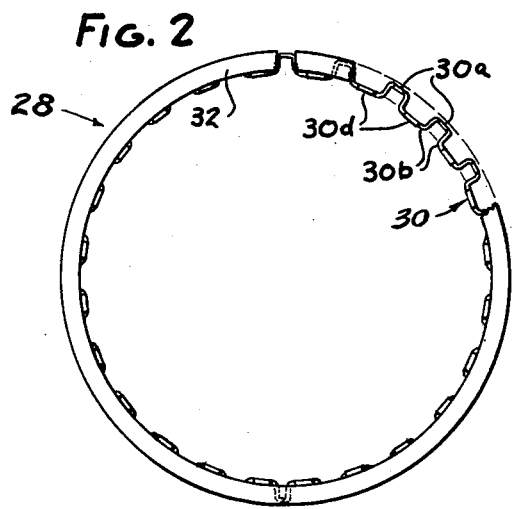
FIG. 2 is a plan view of an oil ring assembly of the invention disassembled from the piston.

As shown in FIG. 2 the upper rail 32 of oil ring assembly 28 is a thin, flat, parted circular member preferably made of chrome plated steel and having an outer peripheral edge adapted to slidably engage the wall of cylinder 22 with an oil sealing fit. The expander-spacer 30 resembles the expander-spacer of the aforesaid Olson patent in that it is generally circular in outline with parted ends adapted to abut when the expander-spacer is compressed. Also, expander-spacer 30 is radially corrugated to provide an outer circular series of crowns 30a which alternate with respect to an inner circular series of crowns 30b.

Figure 3:
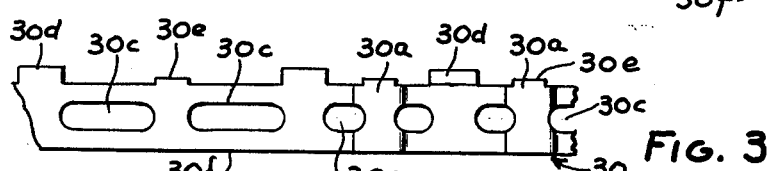
FIG. 3 is an enlarged fragmentary elevational view of an expander-spacer in accordance with the invention illustrating a flat stamped portion thereof as well as a corrugated portion subsequently formed from such stamped portion.
Figure 4:
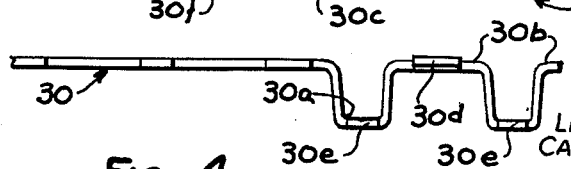
FIG. 4 is a top view of the expander-spacer of FIG. 3.

As shown in FIGS. 3 and 4, expander-spacer 30 is stamped from flat spring metal ribbon stock with longitudinal oil venting slots 30c disposed in the portions which, after a forming operation, become the generally radially extending flexing portions intermediate outer and inner crowns 30a and 30b. The upper longitudinal edge of expander-spacer 30 is cut in the stamping operation to provide alternating lips 30d and pads 30e respectively extending from inner and outer crowns 30b and 30a. However, unlike the expander-spacer of the aforesaid Olson patent, the lower longitudinal edge 30f of expander-spacer 30 is unbroken so that this edge lies entirely in a radial plane after the ring has been formed to its finished circular shape.

Figure 5:
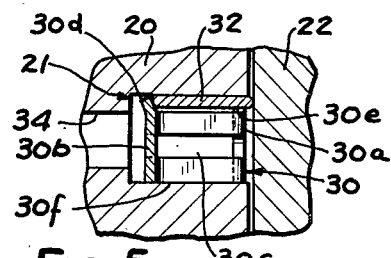
FIG. 5 is an enlarged cross sectional view taken on the line 5—5 of FIG. 1 illustrating the oil ring assembly thereof installed in the piston and bearing against the cylinder wall.

The above described expander-spacer 30 is assembled with rail 32 to form oil ring assembly 28 which is then inserted in oil groove 21 of piston 20 as seen in FIG. 5. The smooth lower longitudinal edge 30f of expander-spacer 30 slidably rests on the lower side of oil groove 21 while the short pads 30e extending from the upper longitudinal edge of the expander-spacer slidably support rail 32 against the upper side of oil groove 21. The somewhat longer lips 30d extend from inner crowns 30b inwardly at an angle inclined from the axis of the ring assembly so as to transmit expansion forces on rail 32 which resolve into axial upward components as well as radially outward components.

In operation, expander-spacer 30 is under peripheral compression and acts to bias rail 32 into sealing engagement with the wall of cylinder 22 as piston 20 reciprocates therein. As piston 20 moves upwardly, a fresh supply of relatively cool lubricating oil from the crankcase is deposited on the cylinder wall. On the downward stroke of piston 20, rail 32 shears this oil film from the cylinder wall and directs it in substantial quantities through the oil vent slots 30c to the interior of oil groove 21. From there the oil is drained to the crankcase via oil passage holes 34 connecting groove 21 with the hollow interior of piston 20. This action occurs almost instantaneously and there is only this one-way flow of oil.

It has been found that with the above described oil ring assembly 28, wherein the lower rail is completely eliminated, a combination flushing and cooling action takes place as a result of the increased oil flow through the ring which prevents oil ring clogging due to carbon buildup on rail 32 and expander-spacer 30. Hence oil ring assembly 28 does not prematurely lock in the groove and become inoperative before it is actually worn out.

Figure 6:
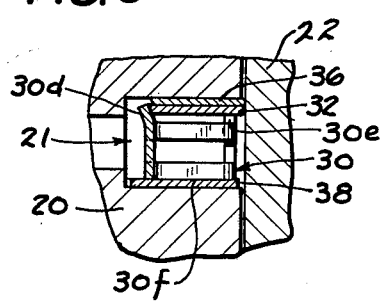
FIGS. 6, 7 and 8 are similar cross sectional views of second, third and fourth embodiments of oil ring assemblies in accordance with the invention.

Referring to FIG. 6, a second embodiment of the oil ring assembly of the present invention is shown in a cross-sectional view operably disposed in oil groove 21 of piston 20. In this embodiment another rail 36, substantially identical with rail 32, is added to the oil ring assembly. Rail 36 is disposed between rail 32 and the upper side of oil groove 21 and provides additional oil control action, especially after the outer peripheral face of rail 32 has worn enough to bring all of the inclined lips 30d into engagement with rail 36.

The assembly of FIG. 6 also includes a thin, circular, parted contracting segment 38 which is disposed between the smooth lower edge 30f of expander-spacer 30 and the bottom side of oil groove 21. Segment 38 has an outer diameter such that the outer peripheral face thereof does not touch the wall of cylinder 22, while the inner peripheral face of segment 38 is snugly fitted to the inner diameter of oil groove 21. Segment 38 is preferably made of steel and is particularly useful when expander-spacer 30 is to be used in a relatively soft aluminum piston. In such use the side thrust or axial forces exerted by expander-spacer 30 are applied to steel segment 38 rather than to the lower side of oil groove 21, thereby reducing the problem of oil groove wear. Also, segment 38 is able to "breathe" or "float" with the radial expansion and contraction of the oil ring assembly and therefore this segment promotes such action in the assembly.

Figure 7:
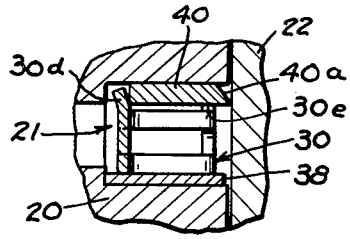
Figure 8:
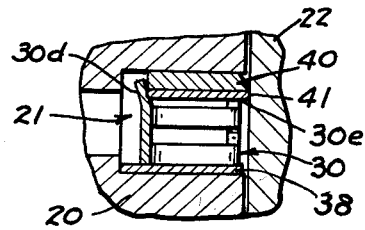

The third and fourth embodiments of the oil ring assembly of the invention shown respectively in FIGS. 7 and 8 differ from that of FIG. 6 only with respect to the type of upper rail used in the assembly. In FIG. 7 the scraping member comprises a circular, parted chrome plated cast iron ring 40 located intermediate expander-spacer 30 and the upper side of oil groove 21. Cast iron ring 40 has an outer peripheral face 40a which is inclined to the axis of the ring such that the outermost, cylinder-wall-engaging portion of face 40a is disposed adjacent expander-spacer 30 so that ring 40 provides effective oil scraping action on the downward stroke of the piston while reducing drag on the upward stroke. The assembly of FIG. 8 combines cast iron ring 40 with a rail 41 which is similar to rail 32.

The operation of the modified oil ring assemblies of FIGS. 6, 7 and 8 is quite similar to that shown in FIGS. 1–5, the scraping members causing a heavy flow of oil to pass through expander-spacer 30 which flushes and cools the same and thereby prevents clogging of the oil ring assembly. It is to be understood that the axial dimension of expander-spacer 30 is reduced in those portions thereof disposed between the above described upper rail elements and segment 38 in order that the modified oil ring assemblies of FIGS. 6–8 correctly fit the oil groove 21.

Figure 9:
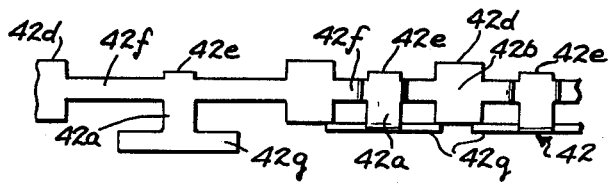
FIG. 9 is a fragmentary elevational view of a modified form of expander-spacer in accordance with the invention.
Figure 10:
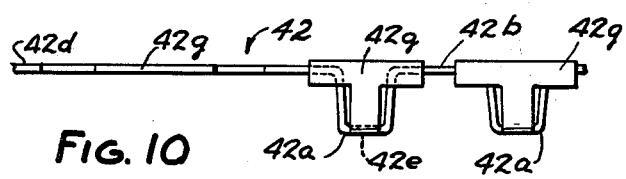
FIG. 10 is a bottom view of the expander-spacer of FIG. 9.
Figure 11:
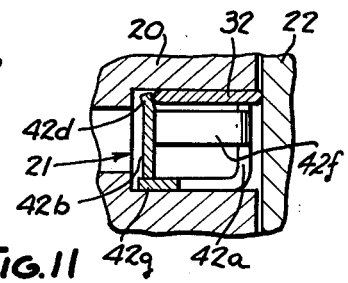
FIG. 11 is a cross sectional view of the expander-spacer of FIGS. 9 and 10 included in an oil ring assembly of the invention and disposed in the oil groove of the piston.

The further modification of the oil ring assembly of the invention shown in FIGS. 9, 10 and 11 utilizes an expander-spacer 42 having a configuration which, like expander-spacer 30, is generally circular in outline with parted ends adapted to abut when the same is circumferentially compressed. Also, expander-spacer 42 is radially corrugated to provide an outer circular series of crowns 42a which alternate with respect to an inner circular series of crowns 42b. Further, expander-spacer 42 is stamped from flat spring metal ribbon stock to provide alternating lips and pads 42d and 42e respectively extending from inner and outer crowns 42b and 42a. However, unlike expander-spacer 30, there are no oil venting slots as such. Instead, the generally radially extending flexing portions connecting outer and inner crowns 42a and 42b comprise single hump-like legs 42f which are axially offset from the center line of expander-spacer 42 towards the upper longitudinal edge thereof. The lower portion of each outer crown 42a, instead of connecting via another leg portion with the adjacent inner crowns 42b, is stamped into a T-shaped pad 42g which in the forming operation is bent inwardly at right angles to the plane of outer crown 42e so that the upper surface of pad 42g lies beneath the lower edge of inner crowns 42b.

As seen in FIG. 11, pad 42g forms a relatively wide supporting surface for the oil ring assembly, which surface rides on the lower side of oil ring groove 21. Thus, supporting pads 42g facilitate the rotational and transverse movement of the ring assembly in the groove by providing an increased bearing area as compared with the corrugated lower longitudinal edge 30f of expander-spacer 30. Expander-spacer 42 also provides an optimum balance of forces for biasing cylinder-wall scraping members, such as rail 32, which are supported solely in the upper portion of the oil groove. This results from the axial offset of flexing legs 42f which causes less axial side pressure and less twisting action to be developed in expander-spacer 42. In addition, the axial offset of legs 42f leaves relatively large openings between the lower portions of the outer and inner crowns 42a and 42b, thereby providing an expander-spacer having a large oil venting capacity. The operation of the modified oil ring assembly of FIG. 11 is similar to that of the previous embodiments of the invention in that the upper scraping members cause the major portion of the oil which is wiped from the cylinder wall to flow through expander-spacer 42, thereby maintaining the ring assembly free of carbon deposits.

Figure 12:
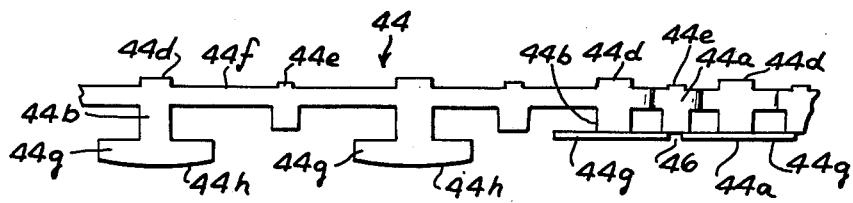
FIG. 12 is a fragmentary elevational view of another modification of the expander-spacer of the invention.
Figure 13:
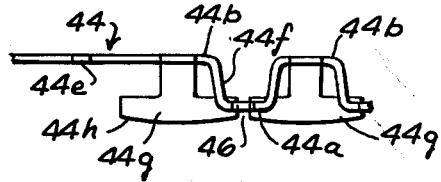
FIG. 13 is a top view of the expander-spacer of FIG. 12.
Figure 14:
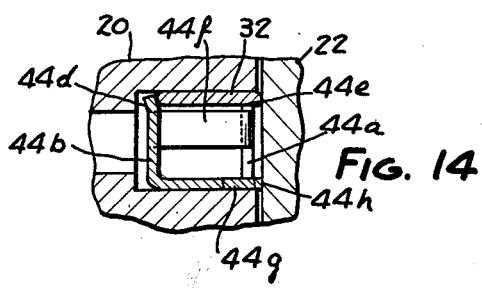
FIG. 14 is a cross sectional view of the expander-spacer shown in FIGS. 12 and 13 included in an oil ring assembly of the invention disposed in the oil groove of the piston.

A further modification of the oil ring assembly of the invention includes an expander-spacer 44 shown in FIGS. 12–14 which again is formed from flat spring metal ribbon stock into a one-piece member which is generally circular in outline and which is radially corrugated to provide outer and inner circular series of crowns 44a and 44b. Pads 44d extend from inner crowns 44b and somewhat shorter lips 44e extending from outer crowns 44a which respectively serve the same functions as the corresponding elements of the previous embodiments. The generally radial flexing portions connecting crowns 44a, 44b comprise single legs 44f which, like legs 42f, are axially offset so as to provide a better balance of forces for the upper scraping members, here again shown as the single rail 32.

The principal difference between expander-spacers 42 and 44 is in the structure and function of the relatively wide supporting pads 44g. Pads 44g are formed integral with the inner crowns 44b rather than with the outer crowns, and are bent at right angles thereto so as to extend radially outward therefrom. The outer peripheral edge 44h of each pad 44g is curved in an arc having a diameter equal to the diameter of cylinder 22 and hence edges 44h and the outer peripheral edge of upper rail 32 lie in the same axial plane so that both rail 32 and pads 44g act as oil scraping elements in this oil ring assembly. The diameter of the arc of pads 44g may be sufficiently less than the cylinder diameter so as to prevent the corners of pads 44g from digging into the cylinder wall in the event of manufacturing misalignment of the expander-spacer. A gap 46 (FIGS. 12 and 13) is provided between adjacent pads 44g so that these pads form an interrupted circumferential surface which, while assisting upper rail 32 to shear oil film from the cylinder wall, still permits enough oil to bypass to rail 32 so that the above described cooling and flushing action is maintained during operation of this assembly. The size of gap 46 may be increased and/or the outer diameter of pads 44g may be reduced as desired to increase the flow of oil through the ring assembly. It is also to be understood that pads 44g do not necessarily have to be scraping members. Pads 44g may be made with a diameter so that none of the peripheral edges thereof contact the cylinder wall and yet such pads will still serve their primary function which is to keep the ring assembly from twisting in the oil groove of the piston.

Although the ring assemblies shown in FIGS. 11 and 14 include the single upper rail 32 described in connection with the first embodiment of the invention, it is to be understood that expander-spacers 42 and 44 are readily modified by shortening the respective axial dimensions thereof so as to operate with the various upper rail scraping members described in connection with FIGS. 6–8. Also, these oil ring assemblies may include the contracting segment 38 when its is desirable to have a steel bearing surface for such assemblies on the lower side of the oil groove. In all of the above described embodiments of the invention the side sealing characteristic thereof is optional; that is, these ring assemblies may be manufactured with the respective lips 30d, 42d, and 44d extending upwardly in an axial plane rather than being inclined inwardly as illustrated.

We claim:

1. An oil ring assembly for use in the oil groove of a piston in an internal combustion engine including in combination, a one-piece expander-spacer of the non-bottoming self-expanding type having openings therein for passage of oil therethrough, said expander-spacer being generally circular with radial corrugations providing alternate inner and outer series of crowns and generally radial flexing portions intermediate said crowns, said intermediate radial flexing portions individually comprising a single leg integral with said crowns and being axially offset from the center line of said expander-spacer towards the upper longitudinal edge thereof to provide maximum circumferential expansion forces therealong, said inner crowns each having a supporting pad portion integral with the bottom thereof and extending radially outward at a right angle therefrom and terminating with an outer peripheral edge curved to fit the cylinder wall of the engine so that said pads together form a circumferential oil scraping structure at the lower side of the oil groove, said pads being circumferentially spaced from one another a predetermined distance to provide oil passage gaps therebetween, and annular, parted rail means disposed solely between said expander-spacer and the upper side of the oil groove, said rail means being biased into sealing engagement with the cylinder wall by said expander-spacer whereby said rail means follows said pads on the downward stroke of the piston to shear the oil remaining on the cylinder wall after passage of said pads, said rail means directing such oil through said openings in said expander-spacer in sufficient quantity to flush and cool the same to prevent clogging of the oil ring assembly during operation of the engine.

2. The combination as set forth in claim 1 wherein each of said outer crowns has a pad portion extending from the upper longitudinal edge thereof for slidably supporting said rail means against the upper side of the oil groove, and each of said inner crowns have a lip portion extending from the upper longitudinal edge thereof and being inclined inwardly relative to the axis of said oil ring assembly so as to engage the inner periphery of said rail means for transmitting axial side sealing forces as well as circumferential expansion forces between said expander-spacer and said rail means.

3. In an internal combustion engine having a cylinder extending between a combustion chamber and the crankcase of the engine, the combination of a piston adapted to reciprocate in said cylinder and including means forming a circumferential oil ring groove therein having axially spaced top and bottom surfaces with said top surface comprising the combustion chamber side of said groove, said piston having oil drainage means communicating between said groove and the crankcase, an annular, parted, radially corrugated, resilient expander-spacer disposed in said groove and having openings therein for passage of oil therethrough, said expander-spacer having means forming a supporting surface therefor normally resting upon and bearing against said bottom surface of said groove and having means forming a ring supporting surface spaced axially from both of said surfaces of said groove, and cylinder engaging ring means disposed between and in sliding contact with said ring supporting surface and said groove top surface, the radial portions of said expander-spacer being axially offset from the center line of said expander-spacer towards said ring means and being circumferentially movable adjacent said ring means for concentrating substantially all of the forces generated by said expander-spacer adjacent the ring means for radially expanding the ring means into oil scraping engagement with the wall of the cylinder with a minimum of twisting reaction forces on said expander-spacer whereby oil is sheared from the cylinder wall primarily by the ring means during movement of the piston toward the crankcase and is deflected in cooling and flushing quantity through the space between the ring means and the bottom surface of said groove.

4. An oil ring assembly adapted for use with an internal combustion engine piston having means forming a circumferential oil groove therein with a pair of axially spaced surfaces adapted to slidably receive said oil ring assembly therebetween, said oil ring assembly comprising a resilient annular, parted, and radially corrugated expander-spacer of the non-bottoming type having openings therein for passage of oil therethrough, said expander-spacer also having means forming a supporting surface therefor adapted to rest upon and bear against the one of said groove surfaces disposed furthest from the combustion end of the piston, said expander-spacer also having means forming a ring supporting surface spaced axially from both of said groove surfaces when said expander-spacer is resting on said one surface, and cylinder engaging ring means adapted to be disposed between and in sliding contact with said ring supporting surface and the other groove surface, said expander-spacer being circumferentially flexible to develop radial expansion forces acting on said ring means, said ring means having a circumferentially continuous outer periphery with a single parting gap therein, said ring means being the sole means in said ring assembly adapted for circumferentially continuous oil scraping contact with the cylinder so that a flushing quantity of oil reaches said ring means and is scraped by said ring means into and through said openings of said expander-spacer.

5. An expander-spacer for an oil ring assembly comprising a generally circular resilient spring member of the non-bottoming, circumferentially self-supporting type, said expander-spacer having circumferentially abutting ends and radial corrugations intermediate said ends, said corrugations comprising alternating inner and outer axially extending crowns and generally radially extending flexing portions intermediate said crowns, said flexing portions being of less axial width than said crowns and being axially offset from the longitudinal center line of said expander-spacer towards one side of said expander-spacer, said flexing portions constituting substantially the sole means in said expander-spacer for developing circumferential expansion forces therein, said expander-spacer being adapted to engage the inner periphery of an oil ring adjacent said one side of said expander-spacer to bias the ring radially outwardly, the axial offset of said flexing portions causing the expansion forces developed in said expander-spacer to be concentrated adjacent said one side thereof.

6. The article set forth in claim 5 wherein said outer crowns each have a generally T-shaped supporting pad joined at the base thereof with the edge of the outer crown disposed farthest from said one side of said expander-spacer, said pad extending radially inwardly from said edge of said outer crown and providing a relatively large bearing area on the side of said expander-spacer opposite said one side thereof and substantially in axial alignment with said inner crowns.

7. The aticle set forth in claim 5 wherein said inner crowns each have a supporting pad joined to the edge thereof farthest from said one side of said expander-spacer, said pad extending radially outwardly from said edge of said inner crown and being shaped to form a relatively large bearing area on the side of said expander-spacer opposite said one side thereof and underlying said outer crowns, said pad having an outer edge disposed radially outwardly of said outer crowns to provide a cylinder engaging surface to help support said expander-spacer against twisting moments resulting from the engagement of said expander-spacer with the ring.

8. The article set forth in claim 7 wherein said outer edge of each of said pads is shaped such that said pads together form a circumferentially discontinuous cylinder scraping ring adjacent the side of said expander-spacer opposite said one side thereof, said pads being circumferentially spaced from one another a predetermined distance sufficient to permit passage of a flushing quantity of oil therebetween to the space between said sides of said expander-spacer.

References Cited in the file of this patent

UNITED STATES PATENTS

| | | |
|---|---|---|
| 2,432,602 | Zahodiakin | Dec. 16, 1947 |
| 2,785,030 | Olson | Mar. 12, 1957 |
| 2,859,079 | Olson | Nov. 4, 1958 |
| 2,893,798 | Olson | July 7, 1959 |
| 3,066,943 | Brenneke | Dec. 4, 1962 |